F. P. & P. F. ECKROAT.
CULTIVATOR.
APPLICATION FILED JUNE 8, 1909.
976,644.
Patented Nov. 22, 1910.
3 SHEETS—SHEET 1.
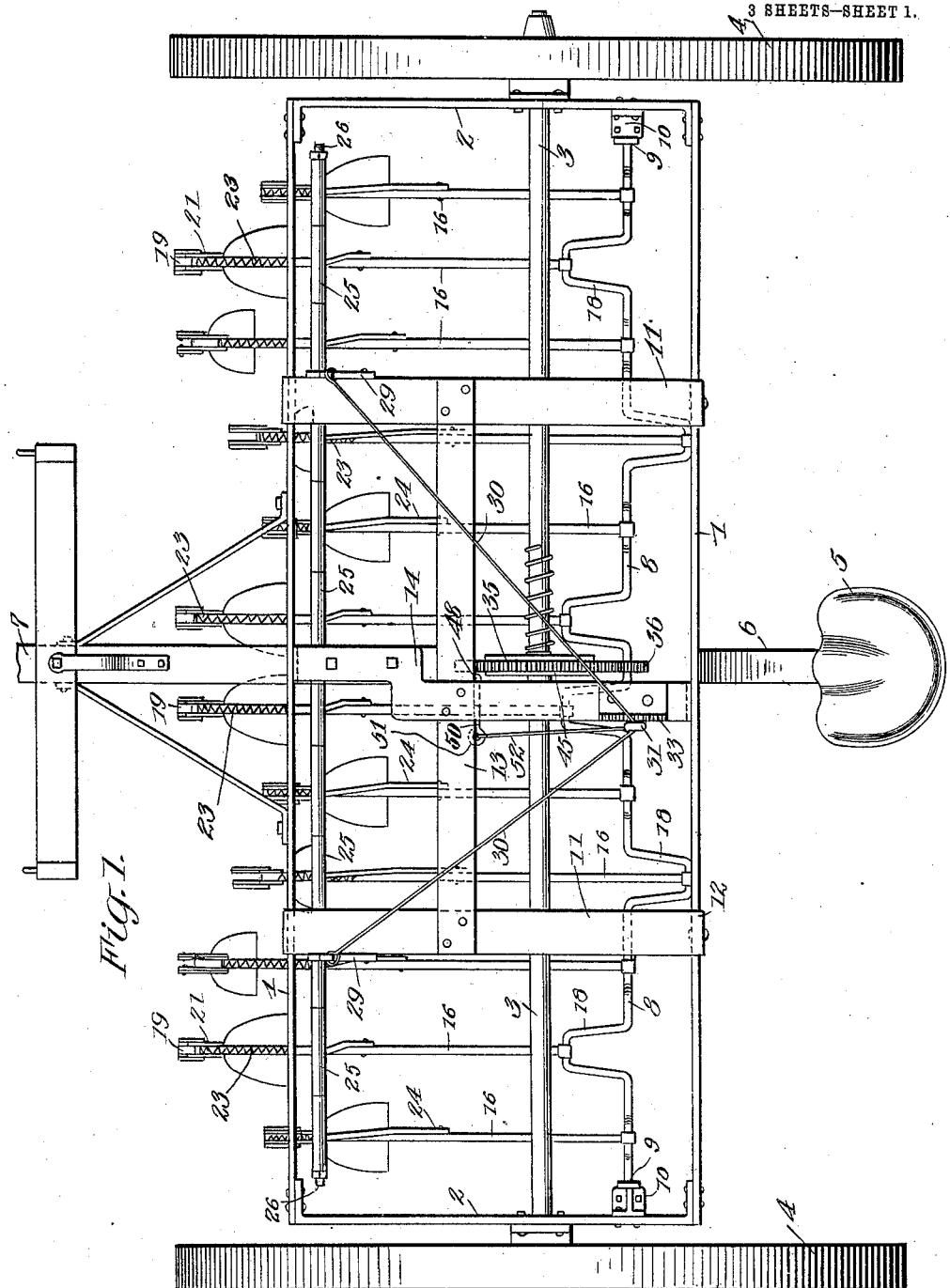
WITNESSES
Samuel E. Wade,
C. E. Trainor
INVENTORS
FRANKLIN P. ECKROAT
PETER F. ECKROAT
BY Munn & Co.
ATTORNEYS F. P. & P. F. ECKROAT.
CULTIVATOR.
APPLICATION FILED JUNE 8, 1909.
976,644.
Patented Nov. 22, 1910.
3 SHEETS—SHEET 2.
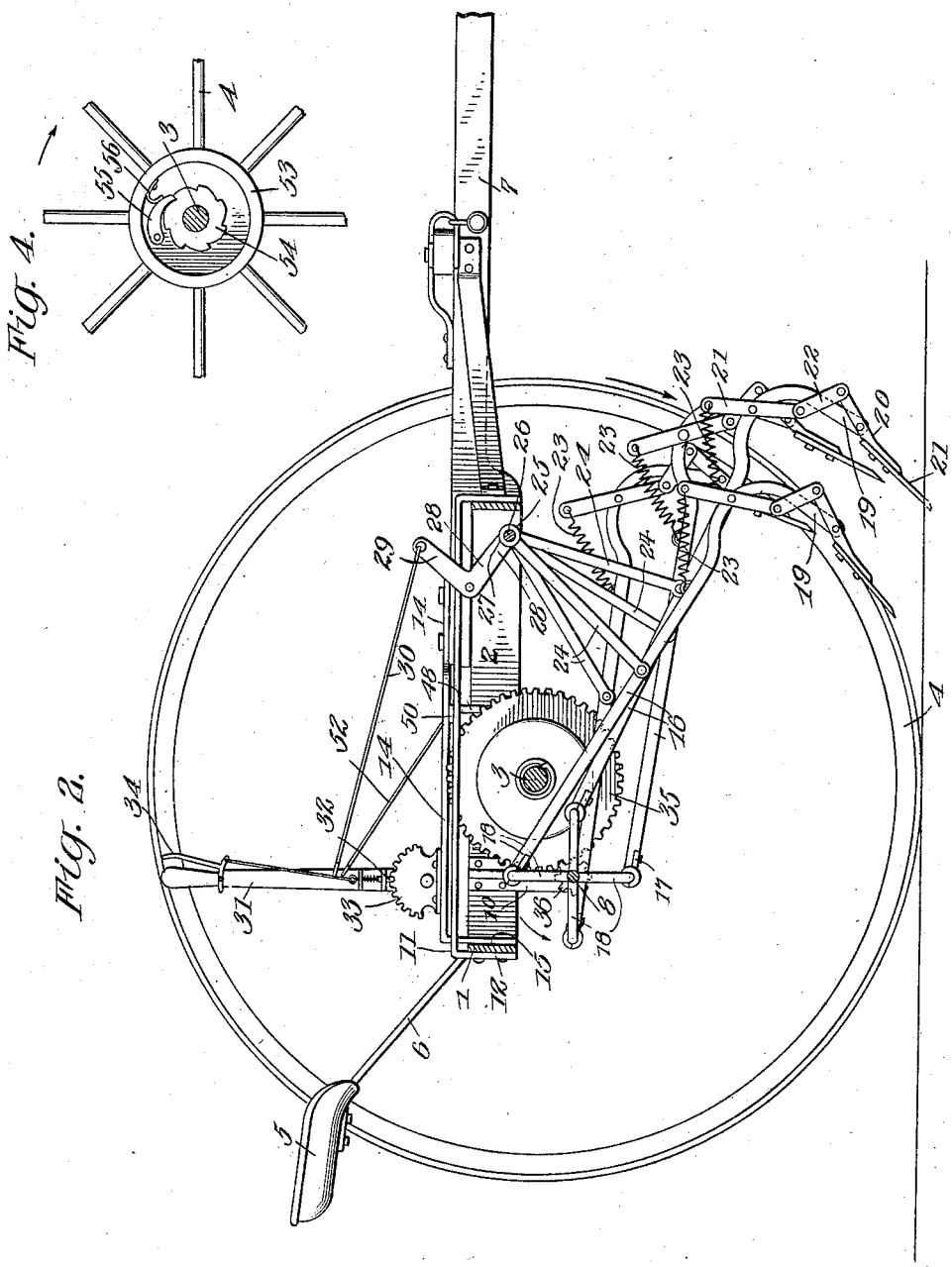
WITNESSES
Samuel E. Wade
C. E. Frazier
INVENTORS
FRANKLIN P. ECKROAT
PETER F. ECKROAT
BY
Munn & Co.
ATTORNEYS F. P. & P. F. ECKROAT.
CULTIVATOR.
APPLICATION FILED JUNE 8, 1909.
976,644.
Patented Nov. 22, 1910.
3 SHEETS—SHEET 3.
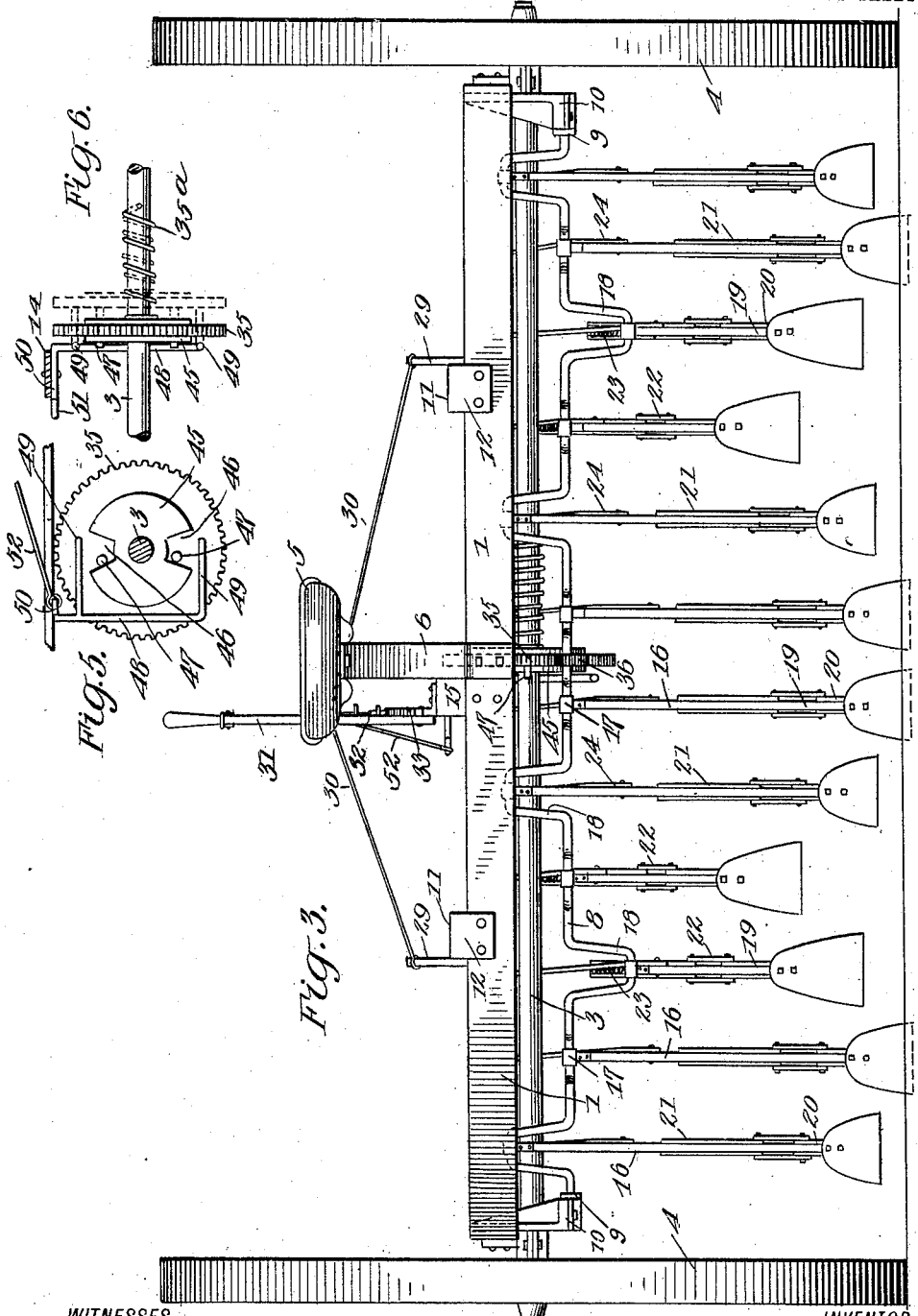
WITNESSES
Samuel E. Wade
O. E. Framor
INVENTOR
FRANKLIN P. ECKROAT
PETER F. ECKROAT
BY Munn & Co.
ATTORNEYS

UNITED STATES PATENT OFFICE.

FRANKLIN P. ECKROAT AND PETER F. ECKROAT, OF SHAWNEE, OKLAHOMA.

CULTIVATOR.

976,644.  Specification of Letters Patent.  Patented Nov. 22, 1910.

Application filed June 8, 1909. Serial No. 500,898.

*To all whom it may concern:*

Be it known that we, FRANKLIN P. ECKROAT and PETER F. ECKROAT, citizens of the United States, residing at Shawnee, in the county of Pottawattamie and State of Oklahoma, have made certain new and useful Improvements in Cultivators, of which the following is a specification.

Our invention is an improvement in cultivators, and consists in certain novel constructions and combinations of parts hereinafter described and claimed.

The object of the invention is to provide a cultivator, wherein the operating mechanism consists of a plurality of hoes, and means for moving the hoes in a manner closely resembling the manner of use of a normally operated hoe.

Referring to the drawings forming a part hereof—Figure 1 is a plan view of the improvement, Fig. 2 is a transverse vertical section, Fig. 3 is a rear view, Fig. 4 is a detail side view of a portion of a wheel showing its connection with the shaft, Fig. 5 is a detail side view of the clutch, and Fig. 6 is an end view of the same.

The embodiment of the invention shown in the drawings comprises a substantially rectangular frame composed of cross bars 1 and side bars 2, and a shaft 3 is journaled transversely of the frame, and a wheel 4 is connected to each end of the shaft outside of the frame, in a manner to be presently described. A seat 5, is connected to the rear cross bar 1 by means of a spring plate 6, and a tongue 7 is connected with the frame on the opposite side from the seat.

A crank shaft 8 is journaled between the side bars, the ends thereof being journaled in bearings 9 on brackets 10 secured to the inner faces of the side bars, and depending therebelow. The cross bars are also connected by plates 11, which are provided with flanged ends 12, secured to the cross bars, and the plates are connected by a cross plate 13, and a plate 14 is connected with the tongue and extends across the frame to a connection 15 with the rear cross bar.

A plurality of handles or rods 16 are provided at one end with a split bearing 17 in which is journaled a crank 18 of the crank shaft 8 before mentioned, and the other end of the rod or handle is curved and bent forming a portion 19 at substantially a right angle to the rod. Each rod has connected therewith, the shank 20 of a hoe blade 21, the shank being pivoted intermediate its ends, and consisting of parallel plates one arranged on each side of the handle, and one member of a pair of parallel levers 21 is arranged on each side of the handle at the curved portion, and pivoted thereto intermediate its ends. A link 22 connects the adjacent end of each lever with the free end of the adjacent shank plate.

A coil spring 23 connects the free ends of each pair of levers with the handle, and a link 24 is pivoted by one end to each handle at approximately the center thereof, and the other end of the link is provided with an elongated bearing 25, which is journaled on a shaft 26. The shaft 26 is supported in bearings 27 in the ends of one arm 28 of a plurality of elbow levers, whose other arms 29 are connected by links 30, with a lever 31 pivoted to a toothed quadrant 33 secured to the frame. The lever is provided with a spring actuated tooth 32 for engaging the quadrant, and the tooth is operated by a grip 34 on the lever. By manipulating the lever, the handles may be simultaneously raised and lowered, without stopping the operation of the same, or may be raised into inoperative position for transportation.

The shaft 3 is provided at approximately its center with a gear wheel 35, which meshes with a pinion 36 on the crank shaft for operating the same. The gear wheel 35 is movable longitudinally of the shaft 3 and is normally retained in engagement with the pinion, by means of a coil spring 35$^a$, encircling the shaft, and bearing at one end there-against. A disk 45 is secured to the shaft on the opposite side of the gear wheel from the spring, and the disk is provided with cut out portions 46, which are adapted to receive pins 47 on the gear wheel face to clutch the gear wheel to the disk.

A yoke 48 is arranged adjacent to the shaft and is provided with arms 49 for engaging and moving the gear wheel against the resistance of the spring, to unclutch it from the disk, and the yoke is provided with a lateral arm 50 pivoted to the plate 14, and having at its end an eye 51 in which is engaged one end of a link 52, whose other end is pivoted to the lever 31 before mentioned.

It will be evident from the description, that when the lever is moved to elevate the shaft 25, the yoke will be swung to move the gear wheel away from the disk, and that when the shaft is lowered the spring will force the gear wheel toward the disk, so that the pins thereon will engage the cut away portions.

The wheels 4, are journaled on the shaft 3, and inside of the hub 53 of each wheel, as ratchet wheel 54 is secured to the shaft, and a pawl 55 pivoted to the hub, and pressed upon by a spring 56 engages the ratchet wheel. It will be evident, that as long as the cultivator moves forwardly, the shaft will rotate therewith, but when the motion of the cultivator is reversed, the pawl will slip idly over the teeth of the ratchet wheel.

We claim:—

1. A cultivator comprising a wheel supported frame, a crank shaft journaled on the frame and provided with a plurality of cranks, a hoe handle journaled by one end on each crank, each of said handles having at its free end an angular portion, a hoe pivoted on the angular portion, a lever pivoted to the handle near the junction of the angular portion with the handle, a link connecting one end of the lever with the hoe, and a spring connecting the other end with the handle, the cranks of the said shaft being arranged at equal angular distances with respect to each other.

2. A cultivator comprising a wheel supported frame, a crank shaft journaled on the frame and provided with a plurality of cranks, a hoe handle journaled by one end on each crank, each of said handles having at its free end an angular portion, a hoe pivoted on the angular portion, a lever pivoted to the handle near the junction of the angular portion with the handle, a link connecting one end of the lever with the hoe, and a spring connecting the other end with the handle.

3. A cultivator comprising a wheel supported frame, a crank shaft journaled on the frame, a hoe handle pivoted at one end to the crank of the crank shaft, said handle having an angular portion at its free end, a hoe pivoted to the angular portion, and means for normally retaining the hoe at substantially a right-angle to the handle, said means being adapted to yield.

FRANKLIN P. ECKROAT.
PETER F. ECKROAT.

Witnesses:
 ROLLA P. PACE,
 L. WHEELER.